Aug. 4, 1931.  E. H. SMYTHE ET AL  1,816,917
APPARATUS FOR THE MEASUREMENT OF ACOUSTIC IMPEDANCE
Filed March 1, 1929  2 Sheets-Sheet 1

INVENTORS: E. H. SMYTHE
P. B. FLANDERS

G. H. Stevenson
ATTORNEY

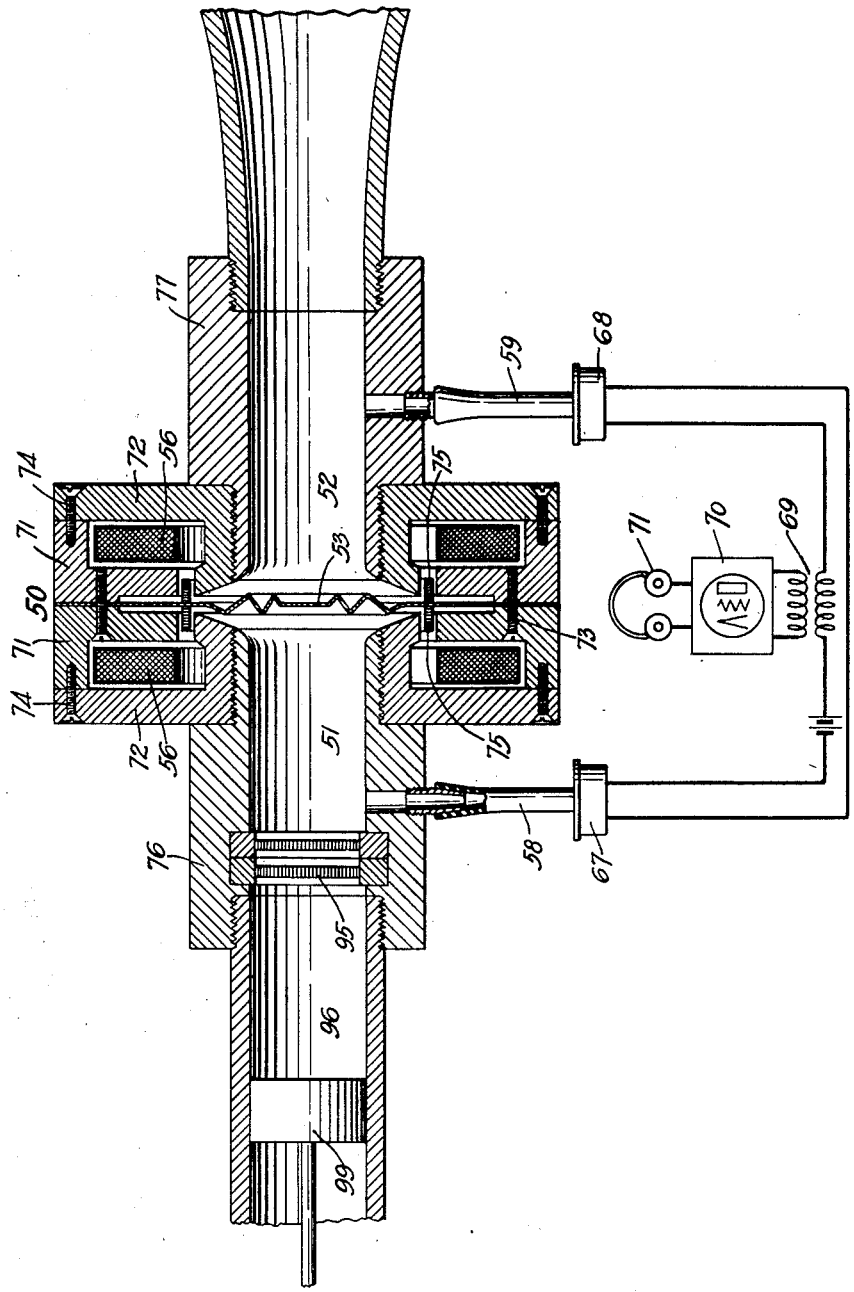

Patented Aug. 4, 1931

1,816,917

UNITED STATES PATENT OFFICE

EDWIN H. SMYTHE, OF EVANSTON, ILLINOIS, AND PAUL B. FLANDERS, OF EAST ORANGE, NEW JERSEY, ASSIGNORS TO BELL TELEPHONE LABORATORIES, INCORPORATED, OF NEW YORK, N. Y., A CORPORATION OF NEW YORK

APPARATUS FOR THE MEASUREMENT OF ACOUSTIC IMPEDANCE

Application filed March 1, 1929. Serial No. 343,778.

This invention relates to arrangements for the comparison of acoustic impedances and has for its object to enable an unknown acoustic impedance to be measured by direct comparison with a standard acoustic impedance of known value.

Arrangements of this invention are analogous to the electrical measuring device known as Wheatstone's bridge, wherein the unknown impedance is associated with a system of three known impedances adjusted to form a symmetrical square network, the condition of symmetry being determined by the absence of any potential difference between two opposite corners of the square when an E. M. F. is applied to the other two corners.

In the acoustic devices of this invention a system of four acoustic impedances, including the device to be measured, is arranged to form two acoustic paths which are joined together at one end and connected to a source of sound waves. The one path includes a fixed acoustic impedance element and an adjustable acoustic impedance, and the other path includes a second fixed impedance and the device to be measured. The fixed impedances are preferably inserted next to the junction of the two paths. For determining the balanced condition of the two paths, that is, the condition of equal wave pressure incident on the adjustable acoustic impedance and on the impedance device to be measured, a bridge conduit which includes a differential wave pressure indicator is connected between the two paths at the junctions between the fixed impedances and the other two.

Particular features of the invention relate to the means for indicating the wave pressure difference between ends of the bridge conduit; to the means for impressing the sound waves upon the two branches of the bridge system; and to the construction of the variable acoustic impedance device whereby the system is adjusted to the balanced condition. Other features relate to constructional details of the sound paths for ensuring a high degree of accuracy in the measurement of impedance at all frequencies in the speech range, and for obtaining measurements over a wide range of impedances.

Fig. 5 shows another modification in which the sound paths are differently disposed with respect to the wave pressure source and the detecting device.

Figure 1:
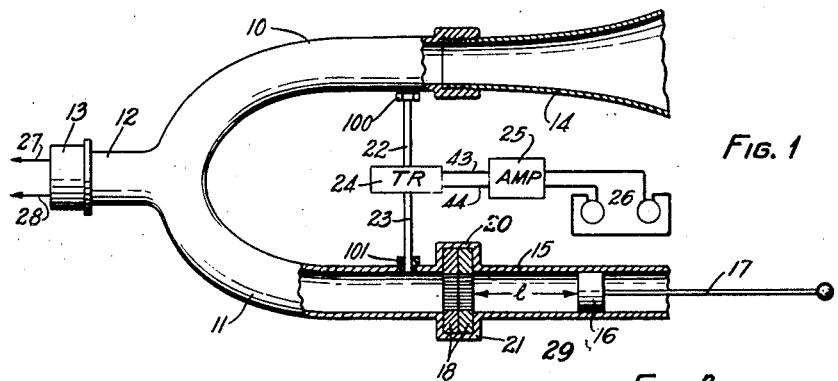
Fig. 1 shows, partly in section, a simple form of measuring system in accordance with the invention.

Fig. 1 illustrates an embodiment of the invention in a simple form. The system comprises two equal sound conduits 10 and 11 branching from a third conduit 12, to which is connected a source of sound waves 13. The sound source is a telephone receiver, leads 27 and 28 of which provide for connection to a source of electrical oscillations. The conduit 10 is provided with means at its outer end for connecting with a device 14 whose impedance is to be measured; a threaded socket is shown for this purpose, although other coupling means may be employed. The connected device shown in the figure is a horn. The outer end of conduit 11 is connected to a variable standard acoustic impedance 29 comprising a tubular conduit 15, the outer end of which is closed by an adjustable plunger 16, and resistance elements 18. In the illustration the conduit 15 is integral with the conduit 11, but these may be constructed as separate parts, if desired, and coupled together by suitable means. A sound path comprising search tubes 22 and 23 and including a wave pressure detecting instrument 24 bridges the outer ends of the conduits. These tubes are connected into the main conduits 10 and 11 through electrical insulating bushings 100 and 101, the purpose of which will be seen later. The pressure detecting instrument converts sound wave pressure into electrical voltage, which is applied to the input of an amplifier 25 by leads 43 and 44, and then, after amplification, to a telephone receiver 26.

The two conduits 10 and 11, the variable standard impedance and the device to be measured correspond to the four branches of the Wheatstone's bridge for electrical measurements, the sound source 13 corresponds to the voltage connected to the opposite corners of the bridge and the search tubes and pressure detecting device correspond to the current responsive instrument connected between the remaining two corners. The conduits 10 and 11 constitute the ratio arms of the system; since they are equal, the ratio is unity. So, if the standard impedance is adjusted to such a value that the pressure drops in the two conduits are equal in magnitude and bear the same phase relationship to the wave pressure at the sound source, then the impedance of the device under test is equal to that of the standard.

The impedance of the device under test is in general complex, that is, resistive and reactive; consequently the standard impedance device must likewise have resistive and reactive components, which should be capable of being varied over a wide range. The reactance is furnished by the closed tube 15 and is made variable by varying the effective length of the enclosed air column by means of a plunger 16 and adjusting rod 17. It is convenient to calibrate the rod to read the effective length of the air column. From this length, the reactance may be computed from the formula $$X = j\frac{\sqrt{P_o \gamma \rho}}{S} \tan \frac{2\pi fl}{c} \text{ c.g.s. units} \quad (1)$$

where X represents the reactance of the tube;
$P_o$, the density of air;
$\gamma$, the ratio of specific heats of air;
$\rho$, the density of air;
S, the cross-sectional area of the pipe;
$c$, the velocity of sound in air;
$f$, the frequency of wave vibrations;
$j$, the imaginary operator, and
$l$, the length of the air column.

Figure 2:
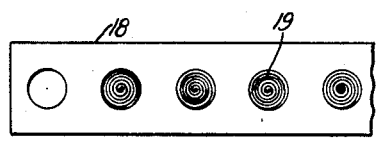
Fig. 2 shows a standard acoustic resistive impedance suitable for use with the system of Fig. 1.

The variable resistance is placed in the tube in front of the plunger, so that it is in series with the reactance of the tube. The resistance consists of two slides 18, such as that shown in Fig. 2, placed side by side across the tube, and constrained in a box guide formed by expanded portions 20 and 21 of the tube. The slides fit snugly in the box guide and can be moved laterally across the tube. Each slide contains a plurality of resistance units 19 in the form of discs whose diameters are equal to that of the tube. These units preferably consist of flat spirals of metallic ribbon wound to provide air passages in the form of very narrow slots, about .002 inch or less in width according to the resistance value desired. The construction of resistance units of this type is described in the copending application of P. B. Flanders, Serial No. 273,523, filed April 28, 1928. The resistance units of each slide are so placed that they can be successively made to fill the cross section of the tube 15 by moving the slide through the box guide. For any resistance setting, a unit of one slide is aligned in the tube with a unit of the other so that the two units are in series and their resistances are additive. The units in the two slides have graded resistance values, preferably in decades with uniform steps starting with zero, so that, singly or in combination, a wide range of values can be obtained.

Figure 3:
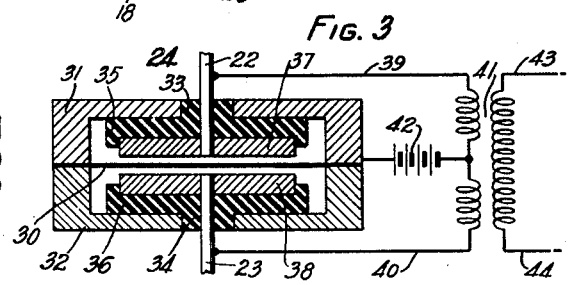
Fig. 3 is a sectional view of a pressure detecting device applicable to the system of Fig. 1.

The pressure detecting instrument 24 for determining the condition of balance, illustrated in section in Fig. 3, is a differentially operated electrostatic transmitter. A metallic diaphragm 30 is clamped between annular projecting portions of two casings 31 and 32. Circular insulating discs 35 and 36 are held flat against the inside surfaces of the casings 31 and 32, respectively, by projecting bosses 33 and 34 which fit tightly into holes in the casings. Metallic plates 37 and 38, constituting electrodes, are mounted on the faces of the insulating discs 35 and 36, respectively, in close proximity to the diaphragm, being held in place in recesses in the insulating discs into which the plates are tightly fitted. The search tubes 22 and 23 extend into the two air chambers formed between the electrodes and the diaphragm, and serve as electrical connections to the electrodes. Electrical conductors 39 and 40 connect the tubes 22 and 23 to opposite ends of the primary winding of a transformer 41. The midpoint of this winding is connected through a battery 42 to the casings of the transmitter and to the diaphragm. Electrical conductors 43 and 44 from the secondary winding of the transformer correspond to the same numbered leads in Fig. 1.

The operation of the pressure detecting instrument is as follows. When waves are introduced to the air chamber on each side of the diaphragm, through the search tubes, the diaphragm is made to vibrate unless the pressures on both sides are equal in magnitude and are in the same phase. When the diaphragm vibrates, the variations in electrical capacity between the diaphragm and the plates 37 and 38 produce currents in the primary winding of the transformer, which can be detected by connecting ear phones to the leads 43 and 44 of the secondary winding. Under the condition of the equality of wave pressure on each side of the diaphragm, no currents are set up, and no sound can be heard in the ear phones.

To make an impedance measurement on an unknown device, the device is coupled to the conduit 10, as previously explained, and electrical oscillations of the desired frequency are supplied to the telephone receiver 13. The plunger rod 17 and the slide containing the resistance units in the variable impedance arrangement 29 are regulated until no sound is heard in the ear phones. Under this condition of balance, the wave pressures at the input ends of the unknown device and the standard variable impedance are equal in magnitude and in phase; and from the analogy with the electrical Wheatstone's bridge, it is seen that the impedance of the device under test is equal to that of the standard impedance.

Figure 4:
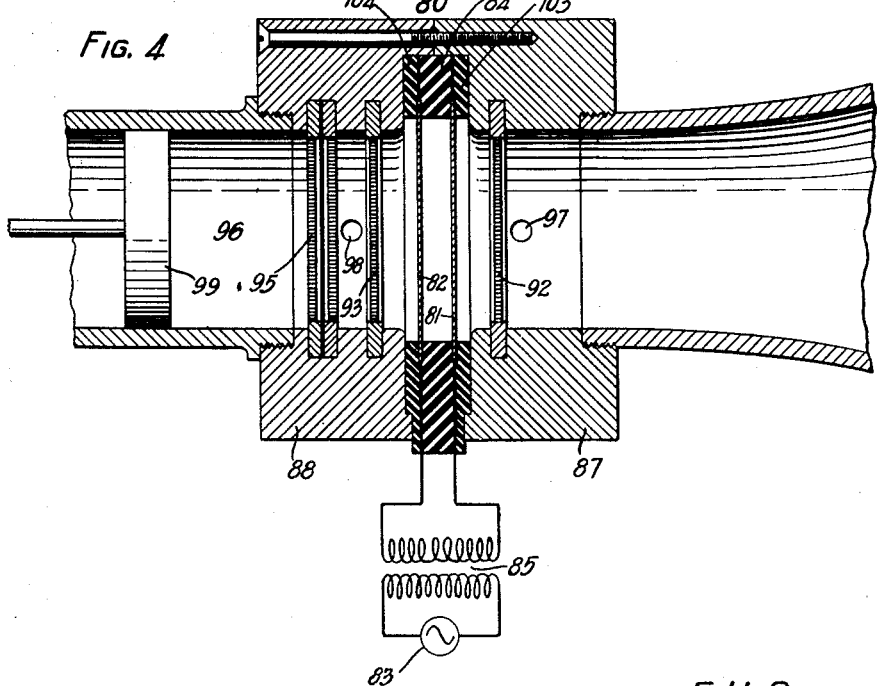
Fig. 4 shows a modified form of the invention.

Fig. 4 illustrates a bridge similar in operation to that in Fig. 1, but different in construction and details. A feature is that very short sound conduits are used for the ratio arms, the impedance being provided by resistance units inserted therein.

The central portion of the bridge consists of an electrostatic telephone receiver 80, having two equal diaphragms 81 and 82, vibrated by an oscillatory voltage supplied from an electrical source 83 through a transformer 85. The peripheries of the diaphragms are held between insulating rings 84, 103, and 104, which in turn are clamped between heavy cylindrical blocks 87 and 88, these latter forming the main support of the apparatus. Projecting lugs on the insulating rings form a bushing through which electrical leads connected to the diaphragm are brought out for connection to the electrical source. The central supporting blocks 87 and 88 form short sound conduits extending in opposite directions from the diaphragms, in which resistance units 92 and 93 are inserted to act as ratio arms. The ratio can be unity, or any other value, according to the values of resistance used. The ratio arm resistance units may be mounted in slides as in Fig. 2, to facilitate changing the ratio, a transverse slot being milled or drifted in the block to accommodate the slides and permit their adjustment. At the outer ends of the blocks provision is made at one end for attaching the device to be tested, and at the other end for the accommodation of an adjustable acoustic impedance standard. The latter is similar to the standard described in connection with Fig. 1, comprising a tube 96 closed by a movable plunger 99, and a variable resistance 95, consisting of a pair of slides with graduated resistance units therein, mounted in a transverse slot in the central supporting block. Two holes 97 and 98, leading into the conduits, are provided, one in the side of each central block just inside the points where the impedance devices are coupled. Each of the holes is adapted to connect with a search tube communicating with a wave pressure detecting system similar to that in Fig. 1. The pressure detecting apparatus is not shown in the figure.

When an oscillatory voltage is applied between the two diaphragms, they vibrate in unison, supplying waves to the two conduits in the same phase. In order that the wave pressures in the two channels will be equal, the diaphragms should be accurately matched as to their weight and stiffness. Since the diaphragms are driven by the electrostatic force between them and since no polarizing potential is provided the frequency of vibration is twice that of the applied E. M. F. It is desirable that the diaphragms should be spaced rather closely to secure a satisfactory response without the use of very large applied voltages.

Impedance is measured with this bridge in the same manner as with the former bridge, except that the ratio of the bridge, if it is other than unity, must be taken into account. The source 83 of electrical voltage is adjusted to supply to the diaphragms a voltage of half the frequency at which an impedance measurement is desired. Then, as before, the variable standard impedance is adjusted until a balance is obtained. To compute the impedance of the device under test, the principle of the Wheatstone's bridge is employed, that is, the impedance of the standard is multiplied by the ratio of the resistance 92 to the resistance 93.

Under certain conditions this bridge furnishes more accurate measurements than the bridge in Fig. 1. It can be shown that when the impedance of the device under test and of the ratio arm to which it is coupled, are equal, the measurement can be made with greater accuracy than when they are unequal. Consequently, when the impedance of the device being tested is approximately known, the ratio arm may be adjusted to the nearest standard value and greater sensitivity will result.

A further advantage possessed by the bridge in Fig. 4 is that a range of impedances can be measured which is larger than the range covered by the standard. This can be done by making the resistances 92 and 93 bear such a ratio to each other that the impedance of the device under test will lie within the range of frequency which is the range of the standard multiplied by this ratio. Since there is a large range of possible ratios, a standard impedance with a limited impedance range can be used to measure impedances over a much wider range.

Fig. 5 illustrates in section a measuring system in accordance with a modification of the invention. A feature of this system is that it comprises two sound channels whose input ends are effectively in series with a source of sound waves.

The sound source is a telephone receiver 50 of the electromagnetic type. It comprises a diaphragm 53 having two driving coils 75 mounted on it, one on each side, and a pair of electromagnets having annular shell-type magnetic circuits in which air gaps are provided for the reception of the driving coils 75. Each magnetic circuit is built up of two annular elements 71 and 72 for the purposes of easy machining and assembling, the two parts being held together by screws 74. The two electromagnets are held together by screws 73, the diaphragm being clamped between them. Magnetizing windings 56 are enclosed within the magnetic shell, the connecting leads being taken out through suitably placed holes, not shown, in the magnets. Leads from the driving coils 75 are taken out in a similar manner.

The receiver element forms the central support for the other parts of the apparatus, the central apertures in the magnets being threaded for the attachment of these parts. Heavy tubular elements 76 and 77, screwed into the apertures of the magnets provide sound conduits 51 and 52, which form the ratio arms of the bridge. The outer end of tube 77 is threaded to receive the device to be tested and the outer end of tube 76 is adapted to receive the adjustable impedance standard, the latter comprising a resistance unit 95 and a reactance unit consisting of a column of air 96 closed by a plunger 99, as described in connection with Fig. 4.

In this modification, due to the fact that the waves impressed on the two sound paths are in opposite phase, the phase relation between the waves at the outer ends of conduits 51 and 52 are reversed with respect to the relation in the modification previously described. To secure a zero tone at the point of balance it is necessary to convert the acoustic pressures into electrical waves and balance these against each other with the phase of one reversed. Search tubes 58 and 59 connected to the outer ends of conduits 51 and 52 lead to microphone detectors 67 and 68 in which proportionate E. M. F.'s are generated. These E. M. F.'s are applied differentially to the primary of transformer 69, the secondary of which is connected through amplifier 70 to telephone receiver 71. It is necessary that the receivers be accurately paired so that the E. M. F. generated by a given wave pressure is the same in each instrument.

What is claimed is:

1. Apparatus for the comparison of acoustic impedances comprising means defining a pair of sound wave transmission paths, the impedances of which are in a known ratio, a variable acoustic impedance coupled to one of said paths, means for connecting to the other of said paths a device to be measured, means for impressing sound waves equal in intensity upon said paths simultaneously, and means for indicating a difference in the wave pressures at the other ends of said paths.

2. Apparatus in accordance with claim 1 in which the variable acoustic impedance comprises an acoustic resistance element in combination with a closed tube of adjustable effective length, said resistance being inserted in the open end of said tube.

3. Apparatus in accordance with claim 1 in which the variable acoustic impedance comprises a closed tube of adjustable effective length forming a variable acoustic reactance, and a sliding member carrying a plurality of graded acoustic resistance elements, said sliding member being arranged to insert said resistance selectively in the open end of said tube.

4. Apparatus in accordance with claim 1 in which the means for indicating a pressure difference comprises a branch acoustic path including a sound responsive diaphragm at its middle point.

5. Apparatus in accordance with claim 1 in which the said sound paths are coupled symmetrically at one end to a common sound wave input conduit.

6. An acoustic impedance bridge comprising two acoustic impedance paths in parallel, a sound wave source common to said paths, a variable impedance coupled to one of said paths, means for coupling an impedance device to be measured to the other path, and an exploring tube in communication with waves at the end of each path remote from the sound source, said exploring tubes communicating differentially with a sound sensitive device.

7. An acoustic impedance bridge comprising a three-channel forked sound conductor having two equal channels, a search tube connected to each of said equal channels at its end, a sound sensitive device having a diaphragm each side of which is in communication with one of said tubes, a variable standard impedance coupled to one of said equal channels, means for coupling an acoustic device to be measured to the other of said equal channels, and means for coupling a sound source to the third channel.

8. An acoustic impedance bridge according to claim 8 in which said variable impedance includes a variable resistance comprising a sound tube, a plurality of slides, each containing acoustic resistance units of graded resistance values, the difference of resistance between a unit and the next largest in value, in one slide, being less than the difference of resistance between two units in another slide, and means for situating said slides side by side across said tube and for allowing said slides to move independently of each other across said tube whereby any resistance unit in one may be aligned in said tube with any resistance unit of another.

9. An acoustic impedance bridge in accordance with claim 7 in which said variable impedance includes a variable reactance comprising a sound-tube whose end is closed by a movable plunger whereby the effective length of said tube is rendered variable.

10. An acoustic impedance bridge in accordance with claim 7 in which said variable impedance comprises a variable resistance situated in a tube in front of a variable reactance.

In witness whereof, I hereunto subscribe my name this 27th day of February, 1929.

EDWIN H. SMYTHE.

In witness whereof, I hereunto subscribe my name this 25th day of February, 1929.

PAUL B. FLANDERS.